United States Patent [19]

Warren

[11] 4,137,837
[45] Feb. 6, 1979

[54] APPARATUS FOR SEPARATING EGG WHITES FROM EGG YOLKS

[76] Inventor: William H. Warren, 830 N. 89th St., Omaha, Nebr. 68114

[21] Appl. No.: 772,674

[22] Filed: Feb. 28, 1977

Related U.S. Application Data

[63] Continuation of Ser. No. 647,444, Jan. 8, 1976, abandoned.

[51] Int. Cl.² ............................................. A23J 1/09
[52] U.S. Cl. ....................................... 99/499; 99/500; 426/490
[58] Field of Search ............... 426/614, 490, 478, 479, 426/480, 495; 99/498, 497, 499, 500

[56] References Cited

U.S. PATENT DOCUMENTS

| | | | |
|---|---|---|---|
| 1,649,874 | 11/1927 | Taylor | 99/499 |
| 2,000,472 | 5/1935 | Muzzio | 99/499 |
| 2,382,222 | 8/1945 | Havas | 99/499 |
| 2,523,777 | 9/1950 | Polcar | 99/499 |
| 2,966,184 | 12/1960 | Willsey | 99/498 |
| 3,133,569 | 5/1964 | Shelton et al. | 99/498 |
| 3,137,330 | 6/1964 | MacLajan | 99/498 X |
| 3,612,122 | 10/1971 | Bjork | 99/499 X |

FOREIGN PATENT DOCUMENTS

| | | | |
|---|---|---|---|
| 1048293 | 12/1953 | France | 99/499 |
| 62805 of | 1913 | United Kingdom | 99/499 |
| 118913 | 9/1918 | United Kingdom | 99/499 |

*Primary Examiner*—S. Leon Bashore
*Assistant Examiner*—Steve Alvo
*Attorney, Agent, or Firm*—Holland, Armstrong, Wilkie & Previto

[57] ABSTRACT

An improved apparatus for separating an egg white from an egg yolk is disclosed for use in an automatic egg breaking and separating operation. The improved separator is used in a method where an egg is cracked and opened and drained into a separator cup. The yolk is supported in an imperforate cup over a substantial portion of its under surface and the surrounding egg white is drained from the yolk into a separate pan through an elongated generally spiral or curving opening in a support member extending upwardly from the yolk support cup. The white collecting pan is positioned to receive the egg white below the yolk cup.

3 Claims, 10 Drawing Figures

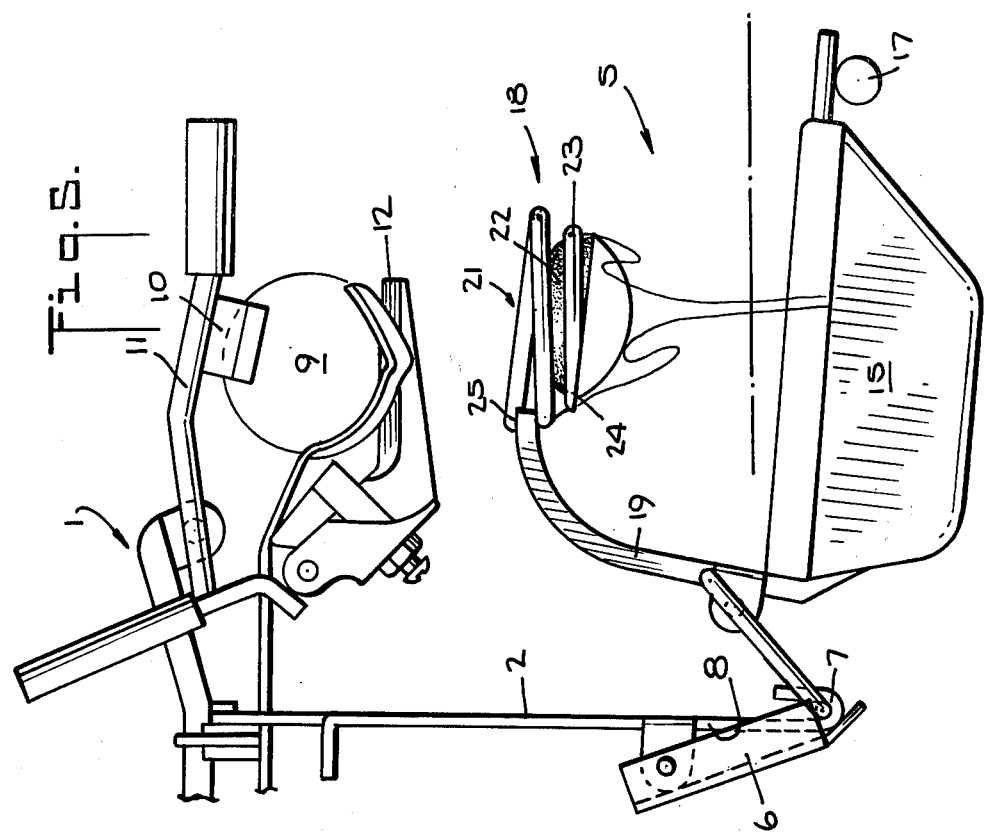
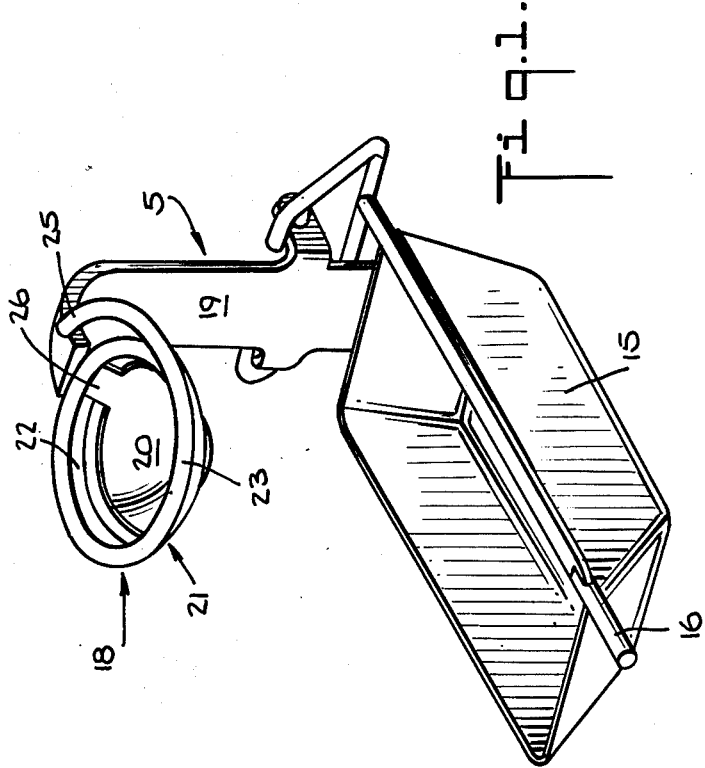
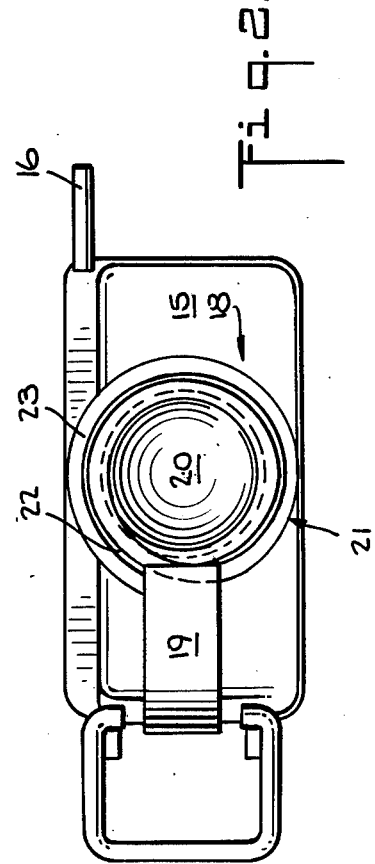

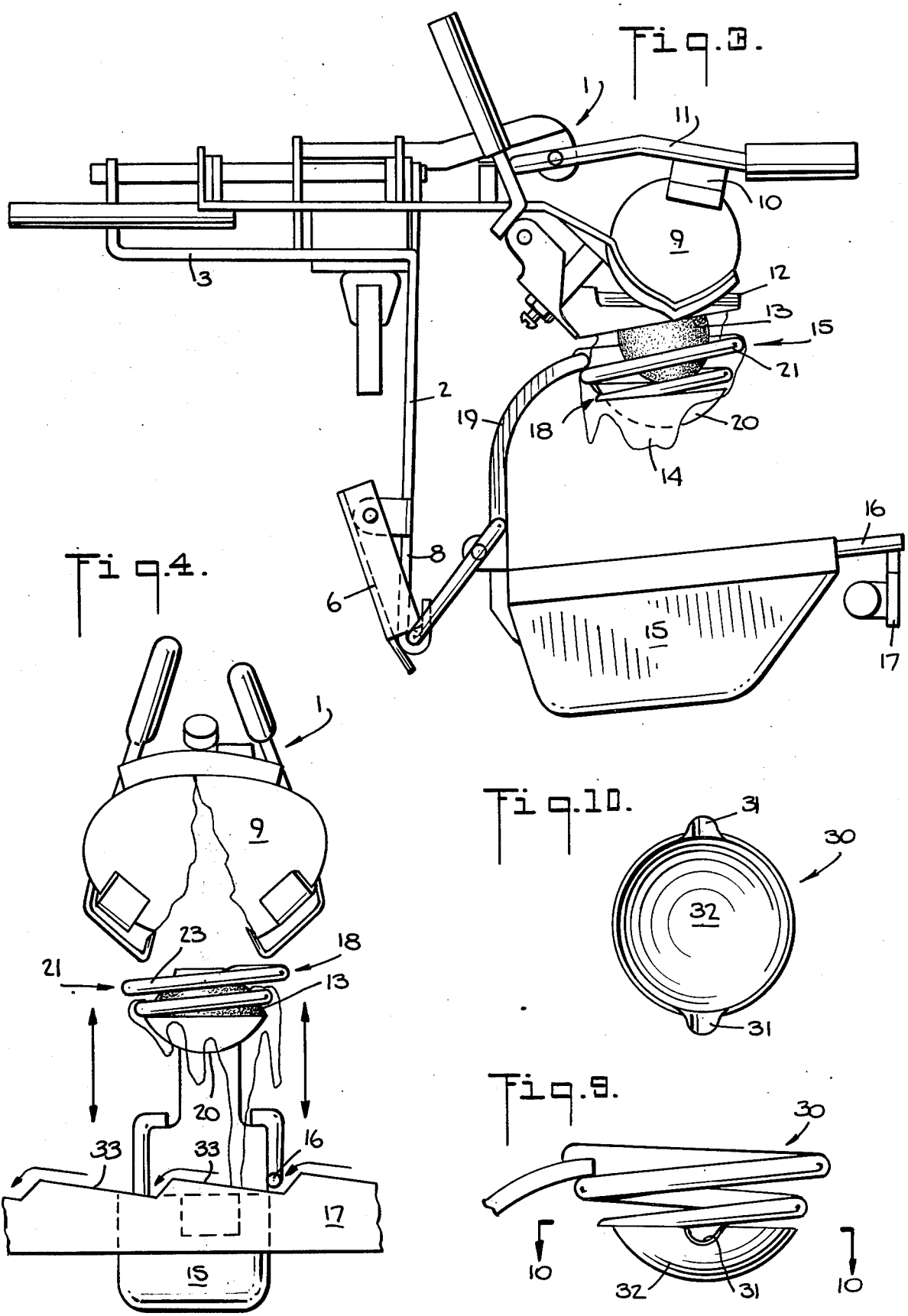

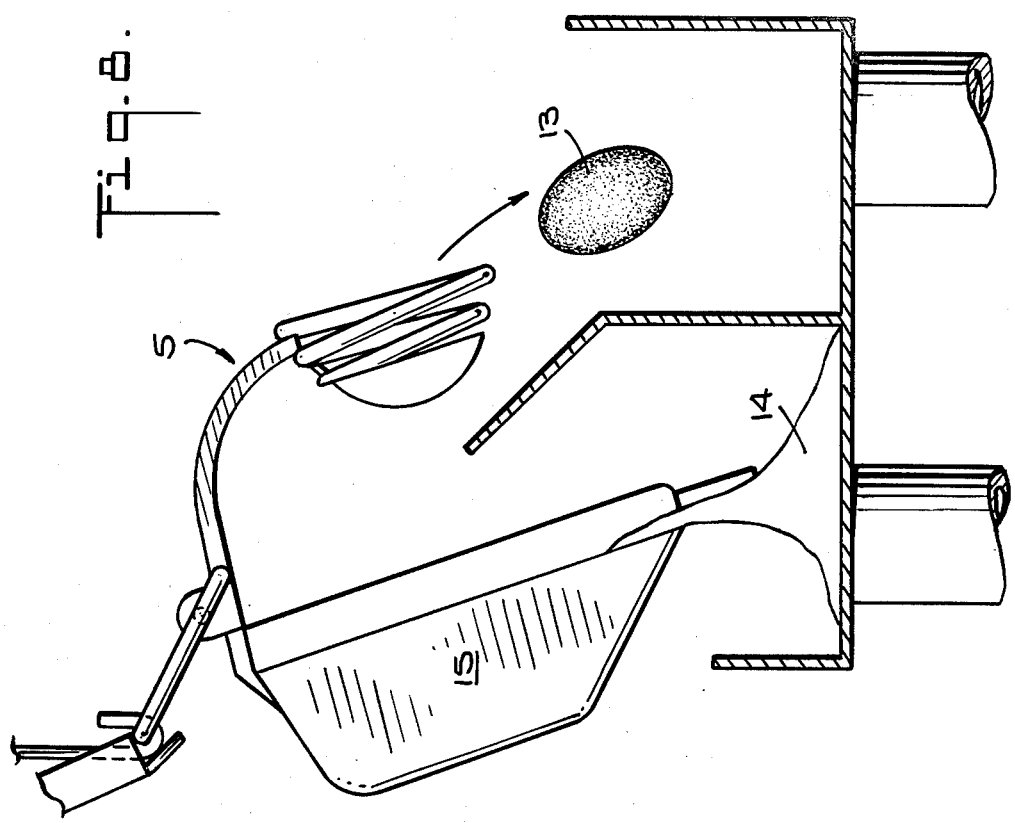
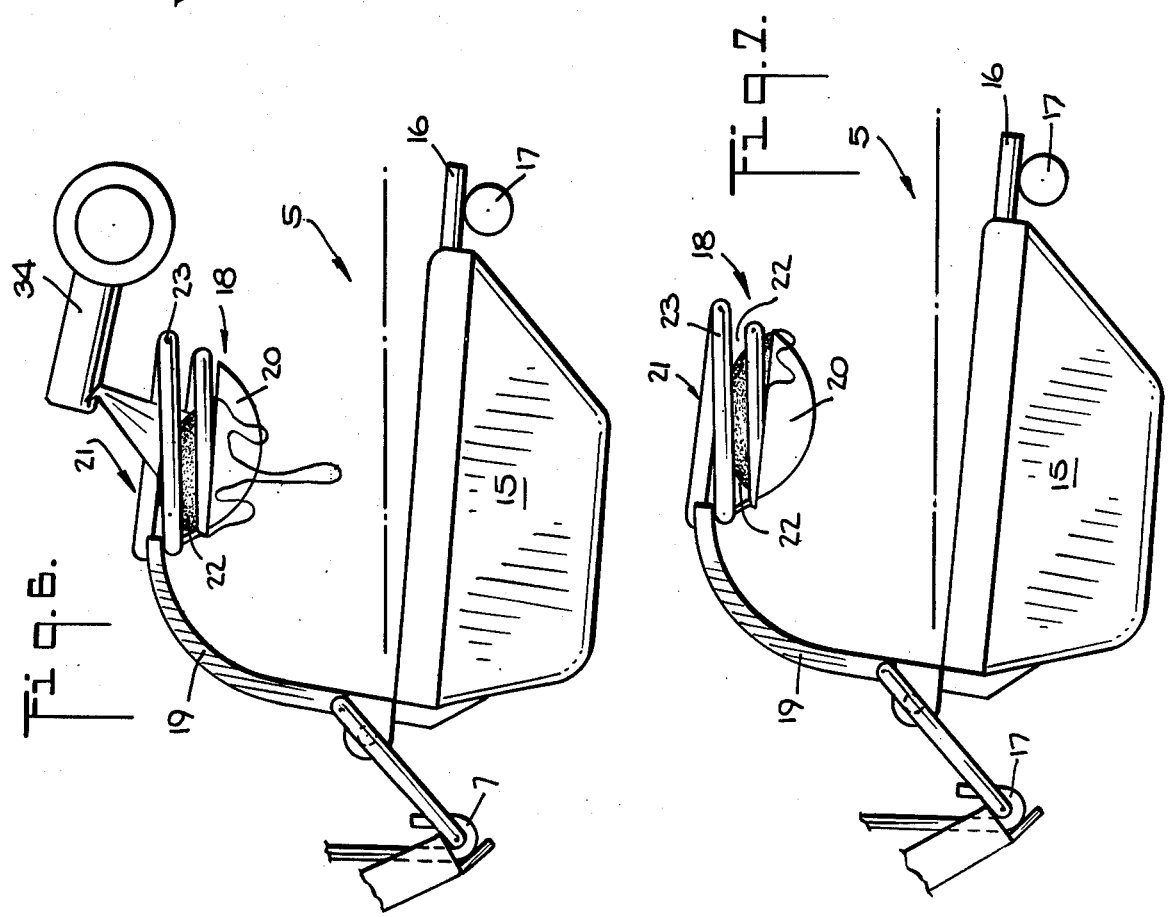

APPARATUS FOR SEPARATING EGG WHITES FROM EGG YOLKS

This is a continuation of Ser. No. 674,444 filed Jan. 8, 1976, and now abandoned.

BACKGROUND OF THE INVENTION

The present invention relates to shell egg processing apparatus and more particularly to an improved means for separating liquid egg yolk from liquid egg white during an automatic egg breaking operation. The separating means of the present invention is an improvement upon and may be used in place of the egg separating means described in U.S. patent application Ser. No. 606,971 filed Aug. 22, 1975, and now abandoned.

The egg industry employs high speed automatic machinery for processing shell eggs where an important part of the processing in many cases involves separating the egg yolks from the egg whites. One present process continually feeds eggs into cracking heads which open the eggs and drain the yolk and the white into a separator means. Known separators have exhibited acceptable separating characteristics at lower separating speeds. The present separator is useful at significantly higher operating speeds and provides improved separating efficiency by reducing the separating time and the percentage of white present in the separated yolks and offers superior protection to the exposed yolk.

SUMMARY OF THE INVENTION

The improved separator in accordance with the present invention receives the egg yolk and white from the cracked and opened egg. The yolk is centered generally with respect to the white and is supported substantially over its entire under surface. The white is drained or separated from the yolk by being directed through a generally spiral or curved opening and elongated slot extending along spiral or curved paths upwardly from about the perimeter of the yolk. This draining means may be jiggled or subjected to air streams to facilitate the egg yolk and white separating action.

The preferred embodiment of the separator means comprises a yolk support having a generally imperforate yolk supporting surface with a spiral or curved egg white drain opening extending upwardly from the imperforate yolk support surface.

The separator is mounted above an egg white collecting pan and the assembled separator and pan are pivotally attached to the separator machine.

Suitable adjustable jiggling means extending along the conveyor path may support and provide a jolting motion of variable amplitude. Air nozzles may also be positioned along the separator path for directing air jets into the separator to assist in the egg white draining operation.

According, an object of the present invention is to provide an improved means for and method of separating egg whites from egg yolks.

Another object of the present invention is to provide an improved separating means and method for providing a more efficient separation of egg whites from egg yolks.

Another object of the present invention is to provide an improved separating means of relative simple structure for separating egg whites from egg yolks at higher separating speeds and at low machine noise levels.

Another object of the present invention is to provide a means for separating egg yolks from egg whites in quiet running automatic machinery.

Another object of the present invention is to protect the exposed yolk in a separating means by providing increased midline support for various sized yolks.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWING

Preferred embodiments of the invention have been chosen for purposes of illustration and description and as shown in the accompanying drawing, forming a part of the specification, wherein:

FIG. 1 is a perspective view taken from the side and front of an improved egg separator in accordance with the present invention.

FIG. 2 is a top plan view of the egg separator of FIG. 1.

FIG. 3 is a side elevational view of the separator of FIG. 1 in position on a conveyor below an egg cracker.

FIG. 4 is a front elevational view of the separator corresponding to FIG. 3.

FIGS. 5-8 are side elevational views of a separator in accordance with the invention mounted on a conveyor below an egg cracking head at successive stages of the separating action.

FIG. 9 is a side elevational view of another embodiment of the egg separator; and FIG. 10 is a sectional view of the separator of FIG. 9 taken along line 10—10 on FIG. 9.

DESCRIPTION OF THE PREFERRED EMBODIMENT

The egg separator of the present invention may be used with automatic egg cracking machinery of a number of differing configurations. Such machines, including those described in U.S. Pat. Nos. 3,455,356 and 3,589,419, for example, include conveyors in the form of endless chains or belts for supporting a plurality of egg breaking heads and a separating means associated with each of the heads.

The eggs are fed to the breaking heads and thereafter each of the eggs is cracked and opened and drained downwardly into the separating means.

FIGS. 3 and 4, for example, illustrate a breaking head 1 of the type described more fully in the above mentioned patents. A number of breaking heads 1 are attached to an endless conveyor or turret or other support on an egg breaking machine. The attachment of a breaking head 1 to the machine includes an angular support bracket 2 coupled at its inner end 3 to the breaking head support.

A separator 5, in accordance with the present invention, is releasably attached by a locking bracket 6 to a lower hook-like end 7 of a depending flange 8 on the bracket 2. The eggs 9, which are being cracked and opened and drained are held in the breaking heads 1 between a hold-down means 10 on support arms 11 in the position illustrated. Pivotally mounted knives 12 are operated to crack the shells of the eggs 9. Thereafter, the cracked egg 9 by the head 1 is opened permitting the egg yolk 13 and the egg white 14 to drain downwardly into the separator 5 as the cooperating breaker 1 and separator 5 are carried through the breaking machine.

The improved separating means of the present invention and its separating action will now be described in more detail. The action of the separating means is independent of the precise form of the egg cracking head so that a variety of cracking means may be used to open the eggs 9 and to drain the egg yolk 13 and the egg white 14 downwardly into the egg separator 5.

FIG. 1 is a perspective view illustrating a preferred embodiment of the egg separator 5 in accordance with the present invention. The egg separator 5 includes an egg white pan 15 having a capacity sufficient to easily accommodate the volume of egg white 14 from the largest eggs normally handled by the egg breaking machine. A guide pin 16 is attached to the pan 15 for the purpose of setting the height of the pan 15 with respect to the breaker 1 as the egg content is dumped and for providing a subsequent pan positioning and variable separator jiggling motion in one embodiment of the invention. The pin 16 rides on an elongated egg separator support guide 17, as illustrated in FIGS. 3 and 5-7, and moves clear of the support guide 17 in a separator dumping motion as illustrated in FIG. 8.

A separator cup 18 is mounted above the pan 15 on a support arm 19. The separator cup 18 functions to separate the yolk 13 from the egg white 14 after they are dumped into it from the cracking head 1 in the manner described below.

FIGS. 3 through 8 illustrate the operation of the egg separator 5 in accordance with the present invention. As seen in FIGS. 3 and 4, the yolk 13 and the egg white 14 drain downwardly into the separator cup 18. The cup 18 is positioned below the breaking head 1 so that the yolk 13 drops onto the yolk support portion 20 of the separator cup 18 which has an imperforate surface with an upwardly facing concave shape, as illustrated.

The egg white 14 flows downwardly over and around the yolk 13 tending to partially fill the yolk cup 18 in the manner illustrated in FIGS. 3 and 4. As the egg white accumulates in the separator cup 18, the portion of the white 14 surrounding the yolk 13 is drained by the white drain portion 21 which extends outwardly and upwardly from the yolk support portion 20.

The cup-like yolk support portion 20 of the separator cup 18 is proportioned and shaped so that it receives the yolk or yolk sac 13 and contains it in a rounded form as illustrated in FIGS. 4 and 5. The yolk 13, in this shape, substantially fills the support portion 20 to its rim causing the egg white 14 to accumulate above the rim of the yolk support portion 20 between the upper surface of the yolk 13 and the outwardly and upwardly flaring surface 5 of the white drain portion 21.

The preferred white drain portion 21 includes an elongated drain slot 22 which encircles this portion for passing the egg white 14 outwardly of the separator cup 18 and downwardly to the pan 15. The preferred shape of the white drain slot 22 is spiral or helical so that it completes more than one full turn as the upper end of the slot merges with the upper edge of the white drain portion 21. A preferred means for providing this shape of drain slot 22 is obtained by bending or otherwise shaping an elongated rod member 23 in the spiral form illustrated so that the curved rod takes the form of an outwardly flaring spiral or helical shape. The white drain portion 21 as illustrated comprises approximately two full turns of the rod 23 with the lower end of the rod being welded or otherwise attached at 24 to the yolk support portion 20 and with its upper end being welded or otherwise attached at 25 to the support arm 9 which connects the separator cup 18 to the pan 15. As can be seen by FIG. 2 the innermost edge of the drain portion has at least the first full turn with its radially innermost edge positioned directly above the underlying outer edge of the yolk support portion.

The white drain slot 22 provides an elongated opening for the egg white 14 drainage action around the entire separator cup 18 at all levels of the separator cup from the upper edge of the yolk support portion 20 to the upper edge of the drain portion 21. A rapid and complete drainage of the egg white occurs because of this since the egg white 14, when it first accumulates in the separator cup 18, drains at all levels simultaneously and continues to drain from the separator cup 18 down to the upper surface of the yolk 13 through the lowermost portion of the spiral-shaped drain slot 22.

If desired, a connecting bar 26 may be welded or otherwise fastened between the adjacent sections of the spiral-shaped rod 23. This relatively narrow bar 26 causes no significant reduction in the flow rate or separating efficiency of the separator 5.

While a drain portion 21 formed of a curved rod has been described, this portion may be otherwise formed as, for example, from a cup-like member perforated with a generally spirally-shaped slot or with separate elongated slot sections arranged so that they combine to provide a substantially arcuately-shaped and elongated drainage slot with about one or more turns.

FIGS. 9 and 10 illustrate at 30 another embodiment of the separator cup where one or more drainage outlets 31 are provided at the rim of the yolk support portion 32. The outlets 31 may be provided for facilitating the final drainage of the egg white 14 from the rim portions of the egg yolk support portion 32 particularly for smaller type egg yolks. The separator cup 30 operates otherwise in a manner similar to that described above.

During the draining period as the separator 5 is carried on the conveyor through the positions illustrated in FIGS. 3-8 and with its attitude controlled by the guide 17 and the guide follower pin 16, the draining of the egg white 14 may be facilitated by imposing a jiggling motion on the separator 5. This jiggling is applied by vertically adjustable steps 33 on the guide 17 over which the separator guide pin 16 glides (FIG. 4). For example, an up and down movement where the separator 5 is moved up and down several times through adjustable heights has been found useful.

Additionally, it has been found effective to direct a stream of air into the separator cup 18 as illustrated in FIG. 6. For example, an air stream may be directed by a nozzle 34 into the separator cup 18. This action may be repeated using additional nozzles or sets of nozzles at varying angles. The air nozzles are conveniently mounted along the path of the separators 5 and adjacent to the conveyor 2 which carries the separators 5.

An improved separating action is obtained in this separator which is rapid and which results in a fully satisfactory separation of the egg white from egg yolk. The separator cup has a relatively long opening between the turns of the rod 23. This opening extends about two complete turns between the lower yolk support portion 20 and the upper end of the rod 23 adjacent to the support arm 19. The principal separating action, however, takes place in a portion of this slot which extends approximately 330° from the upper end of the spiral rod 23 around to a point adjacent the support 19.

The width of this slot between the turns of rod 23 throughout this 330° section has been found to be most effective with a width of about one-quarter inch. The adjacent portions of the spiral rod 23 above and below this slot section provide an adequate support for the edges of the yolk 13 both for a single yolk and for an occasional second yolk from a double yolk egg.

Rapid and effective drainage of the white 14 in the slot 22 is obtained as the white 14 drains quickly through the particular portion of the slot 22 where the maximum white build-up occurs as the white 14 drains downwardly from the cracked and opened egg. The efficiency of the drainage is increased since the separating or outward white flow occurs at the point of maximum build-up regardless of where it occurs within the separator cup. A rapid and unimpeded flow of the white 14 through this portion of the slot 22 tends to draw adjacent white 14 around the slot 22 and through the opening due to the high flow rate or momentum of the draining white. The drainage action is further facilited by the downward spiral of the slot 22 as the downward force of the flowing white 14 turns the yolk 13 on the yolk support cup 20 to whatever yolk position most readily facilitates the white draining operation at the point of maximum white build-up.

The related method comprises draining the egg white from the yolk through the elongated and inclined slot and thereby causing the flowing white to build up or to concentrate its mass at a narrow portion or zone of the slot. This zone often, but not always, occurs at the lower end of the wide 330° upper portion of the slot 22 near the bar 26. The spiral-shaped edges of the slot 22 formed by the spiral rod 23 provide an almost continuous yolk edge or mid-line support for the yolk during the white draining period preventing yolk rupture.

In addition to the above discussed 330° principle drain portion, the slot 22 also extends on down to the edge of the yolk support cup 20. This additional slot portion provides for a full drainage of white 14 from the zone immediately adjacent to the edge of the yolk 13. In particular, it drains the light white 14 which readily drains through this narrower and lower portion of the slot 22.

It will be seen that an improved means has been provided for a rapid and efficient separation of egg whites from egg yolks. The improved separator is adapted for use in high speed automatic egg breaking machines. The improved separating action of the separators permits the operating rate of existing egg breaking machines to be increased when these separators are substituted for prior designs. They therefore may be used to improve existing egg breaking systems.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An egg separator for use on an automatic egg separating machine having means for mounting and for moving a plurality of the separators below egg breakers comprising the combination of:
   an egg white receiving pan;
   a separator cup;
   means for positioning said separator cup at a position above said pan;
   said separator cup having a generally imperforate concave upwardly facing yolk support portion for engaging the bottom and radially outermost portions of the yolk;
   a white drain portion fixedly attached to and extending upwardly from the rim of said yolk portion;
   a spirally shaped drain slot in said drain portion extending more than one turn around said drain portion, substantially encircling said drain portion, and having an end portion at the top of the yolk support portion;
   said drain slot being positioned for passing egg white downwardly to said pan; and
   said white drain portion adjacent to said drain slot being in the form of a sprial extending upwardly from the top of said yolk support portion and having at least the first full turn with its radially innermost edge positioned directly above the underlying outer edge of the yolk support portion for providing secondary support for the radially outermost portions of larger egg yolks.

2. The separator as claimed in claim 1 in which the yolk support has an upper edge having one or more lowered portions for draining the egg white.

3. The separator as claimed in claim 1 in which said white drain portion comprises a helical member with said slot comprising the spaces between turns of the helical member.

* * * * *